Oct. 12, 1943.  W. W. EATON  2,331,667
VIEW FINDER
Filed Jan. 23, 1942
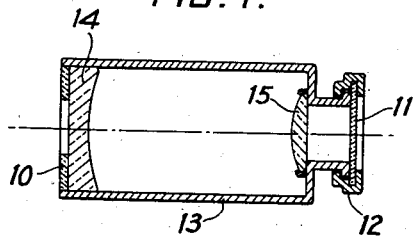
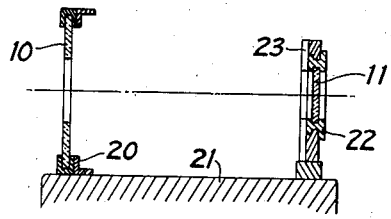
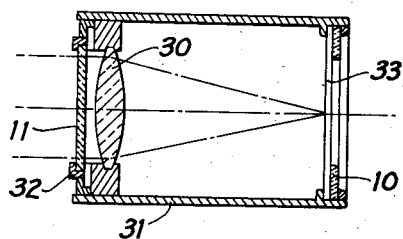
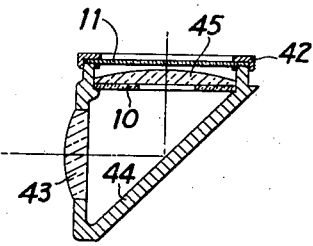
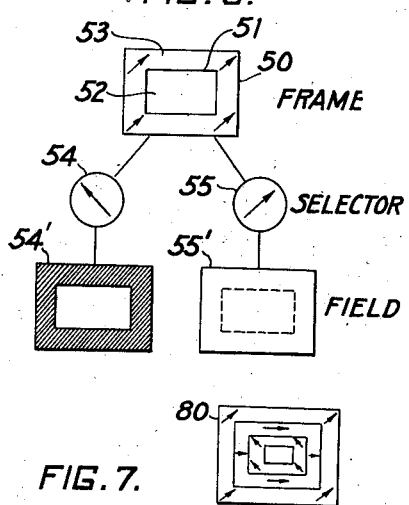
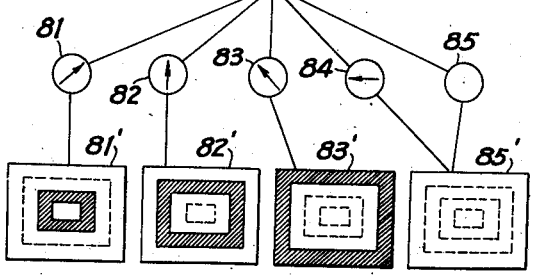
WILLIAM W. EATON
INVENTOR
BY
ATTY & AGT Patented Oct. 12, 1943

2,331,667

UNITED STATES PATENT OFFICE 2,331,667

VIEW FINDER

William W. Eaton, Rochester, N. Y., assignor to Eastman Kodak Company, Rochester, N. Y., a corporation of New Jersey Application January 23, 1942, Serial No. 427,963

8 Claims. (Cl. 88—1.5)

This invention relates to view finders such as used on photographic cameras.

It is the object of the invention to provide a variable field view finder, particularly one in which the changeover from one field size to another is simple, convenient and accurate. The invention is equally applicable to all types of view finders including the direct view type without any lenses, the inverted Galilean telescope type, the terrestrial telescope type or any other in which an objective lens is used for forming an image on a ground glass or field lens, such as in the brilliant type finder or reflux finders.

It is an object of the preferred embodiment of the invention to provide a view finder with several different field sizes.

According to the invention, a variable field view finder is made up with plane polarizing filters for distinguishing between the different field sizes. That is, there are means for defining substantially concentric rectangles corresponding to the different field sizes and at least one plane polarizing filter is included between one pair of successive rectangles. Another plane polarizing filter is rotatably mounted in the path of the light through the defining frame and is used as a selector. Rotation of this selector renders the rectangular filter or more exactly the border filter, alternatively effectively clear and opaque.

In a direct view type of finder, the field defining means are placed in the front member with one or more concentric border filters; if there are more than one filter, the vibration axes must be differently oriented so as to be selectively opaqued by the selector filter mounted rotatably near the eyepiece. In all of the embodiments of the invention, the frames or rectangles mentioned above need not be absolutely concentric but may be slightly shifted for instance to compensate for parallax since it is common practice to correct shorter focal length lenses for some fixed fairly near distance, rather than for infinity. When an inverted Galilean type of finder is used, the polarizing frame or frames are mounted adjacent to the negative front lens and the rotating filter is mounted adjacent to the positive eyepiece. When the selector filter is rotated so that some particular polarizing frame is opaque, the inside edge or rectangle of that frame accurately defines the required field of view. The selector may be provided with a scale marked in the focal length of the lenses having the corresponding fields of view.

When the invention is applied to a reflex or brilliant type finder or any finder in which a positive objective lens is used to form an image such as on a ground glass, the polarizing frames, i. e., the means for defining concentric rectangles is mounted adjacent to the image plane such as the ground glass or field lens of a reflex finder. Of course, the selector filter may be either in front of or behind the polarizing frames as long as it is in the path of the light through the frames, but in the real image type of finder, it is usually convenient to mount the selector adjacent to the objective lens.

Since there is usually no point in opaquing the center rectangle of the frame, this center is usually left perfectly clear without any polarizing filter or provided with a non-polarizing neutral filter. If only two sizes of field are required, a single polarizing border is mounted to surround this center clear area. When the selector filter is oriented so as to transmit equally the light from both the border and the center, the field is then defined by the outside rectangle, but when the selector is rotated to opaque the border, the field is that corresponding to the center rectangle.

Similarly, when a plurality of different field sizes are required, the successive borders between successive pairs of rectangles include polarizing filters with axes differently oriented so that different borders may be selectively opaqued by proper orientation of the selector filter.

Of course, even when the selector filter is not rotated so as to opaque a certain frame completely, it does cut down the light from this frame by varying amounts. However, it is well known that the change from practically opaque to fairly highly transmitting as the selector is rotated, is very rapid and for all practical purposes, the frames can be considered as completely transparent, except when the selector is oriented so as to make them effectively opaque. This feature and the objects and advantages of the invention will be more fully understood in the following description when read in connection with the accompanying drawing, in which:

Figure 1 is an inverted Galilean type of finder incorporating the invention.

Figure 2 shows a zero power direct view finder incorporating the invention.

Figure 3 shows a real-image forming type of finder incorporating the invention.

Figure 4 shows a brilliant type finder incorporating the invention.

Figure 5 illustrates the principle of a simple embodiment of the invention.

Figure 6 illustrates a more complicated embodiment having three field sizes.

Figure 7 shows a still more elaborate embodiment having four field sizes.

In Figure 1 a frame or rectangle defining means 10 constitutes part of the front member of a direct view finder. A plane polarizing filter 11 is carried by rotatable mount 12 on the housing 13 of the finder to intercept light passing through the frame 10. A negative lens 14 is mounted adjacent to the frame and a positive eye lens 15 is adjacent to the rotatable selector filter 11. The operation of the invention is described in connection with Figures 5 to 7.

In Figure 2 no lenses are included, but as before the frame or rectangle defining means 10 is mounted in front of a selector filter 11 rotatably carried in a rim 22 by a support 23. This support, together with the support 20 for the frame 10 is mounted on a camera 21 only the edge of which is shown.

In Figure 3 a real image type of finder which may be part of a terrestrial telescope, includes a positive lens 30 supported by the housing 31 to form an image on a ground glass or other diffusing surface 33. In such a finder, the frame or rectangle defining means 10 is mounted adjacent to the ground glass 33 and the selector is mounted to intercept the light through this frame preferably as shown at 11 immediately in front of the objective 30 and is rotatably carried by a rim 32.

Figure 4 shows a brilliant type finder which operates on the same principle, an image being formed by the lens 43 and mirror 44 in a plane adjacent to which is mounted a field lens 45. The frame or rectangle defining means 10 is mounted in this plane and the selector filter 11 is rotatably mounted in a rim 42 immediately above the field lens 45.

In all of the above embodiments, the frame or rectangle defining means 10 may have various forms such as illustrated in Figures 5, 6 and 7. In the arrangement shown in Figure 5, two field sizes are accommodated, namely, those defined by the rectangles 50 and 51. The border or band between these two rectangles includes a plane polarizing filter 53 with its vibration axis oriented as indicated by the arrows. The center rectangle 52 is perfectly clear. This unit constitutes the frame or rectangle defining means 10 in the simplest embodiment of the invention. If the selector 11 is oriented as shown by the circle 54, light through the filter 53 is effectively opaqued as illustrated by the view 54' as seen in the finder. Similarly, if the selector is oriented as by the arrow in the circle 55, the field is that seen as 55'. Thus, with the selector oriented as shown at 54, the field corresponds to the small rectangle 51 and when the selector is rotated to the position shown at 55 or is removed, the field is that corresponding to the large rectangle 50.

In Figure 6 three field sizes corresponding to rectangles 60, 61, and 62 are contemplated. In this case filters 63 and 64 between successive rectangles have their axes oriented at right angles as indicated by arrows. If the selector is now oriented as shown in circle 66, the frame 64 is opaqued and the field of view is that shown at 66' so that the effective field of view corresponds to the smallest rectangle 62. Similarly, if the selector is oriented as shown in 67, the filter 63 is opaqued as shown in 67' and the field is that corresponding to the rectangle 61. Now, if the selector is oriented as shown at 68 or as shown at 69 or even if it is removed entirely as illustrated by the empty circle at 70, none of the frame filters are opaque and the field is that shown at 70'. Of course, even with the selector removed as shown at 70, the filters 63 and 64 absorb some light and hence, to insure uniformity of transmission all across the field, a neutral density may be inserted in the center rectangle 62. This neutral density is preferably non-polarizing and equally transparent to all plane polarized light whatever its angle of vibration. Furthermore, the absorption of light by the filters 63 and 64 is enhanced by the presence of the selector even when oriented as shown at 68 and 69. Therefore the non-polarizing filter over the center rectangle may preferably have a density corresponding to that of the filters 63 and 64 combined in the selector oriented as shown at 68 or 69. Of course, in this case, when the selector 66 is oriented as shown at 67, the filter 64 is somewhat more transparent-appearing than the center rectangle, but this is quite harmless. In any case, the so-called opaqued condition gives a band which is so many times more dense than any other part of the frame, that there is no question whatever about what part of the frame is to be taken as the field of view.

In Figure 7 the front member 80 has successive borders or bands made up of filters with their vibration axes oriented as shown and rotation of the selector to the positions 81, 82, 83, and 84 (complete removal as shown at 85 may alternatively be used instead of the orientation at 84), gives fields as shown at 81', 82', 83', and 85'. As before, when the selector is oriented for example, as shown at 84, the outside and next-to-inside rectangles will appear slightly more dense than the other two portions of the frame, but this defect is so small as to make the whole of the frame appear effectively clear as shown at 85'. A preferred form of the invention has the successive frames oriented as shown so that rotation of the selector in one direction, e. g., counter-clockwise as shown, selectively opaques successive frames.

Having thus described the preferred embodiments of my invention, I wish to point out that it is not limited to these structures, but is of the scope with the appended claims.

What I claim and desire to secure by Letters Patent of the United States is:

1. A variable field view finder comprising means for defining substantially concentric rectangles corresponding to different field sizes, including a plane polarizing light filter between at least one pair of successive rectangles, a selector plane polarizing filter in the path of the light through the defining means and means for rotating the selector filter to render the first-mentioned filter alternatively effectively clear and opaque.

2. A variable field view finder comprising front and rear members and supports therefor, the front member including means for defining substantially concentric rectangles corresponding to different field sizes, said means including a polarizing filter between at least one pair of successive rectangles, and the rear member including a selector polarizing filter and means for rotating the selector filter alternatively to transmit and cut off light from the first-mentioned filter.

3. A finder according to claim 2 in which the front and rear members also include a negative lens and a positive eye lens respectively.

4. A variable field view finder comprising an objective lens for forming a real image of the object to be viewed, means at the plane of said real image for defining the field by substantially concentric rectangles corresponding to different field sizes, said means including a plane polarizing light filter between at least one pair of successive rectangles, a selector plane polarizing light filter in the path of the light through the defining means and means for rotating the selector filter to render the first-mentioned filter alternatively effectively clear and opaque.

5. A finder according to claim 4 in which the selector filter is rotatably mounted adjacent to the objective lens.

6. A finder according to claim 1 in which the center one of the concentric rectangles has a transparency independent of the direction of vibration of plane polarized light incident thereon.

7. A variable field view finder comprising means for defining substantially concentric rectangles corresponding to different field sizes, including a plurality of plane polarizing light filters, one on each area between successive rectangles, with their vibration axes differently oriented, a selector plane polarizing filter in the path of the light through the defining means and means for rotating the selector selectively to render different areas of the defining means effectively opaque.

8. A finder according to claim 7 in which the orientations of the axes of successive filters follow one another consecutively whereby rotation of the selector filter in one direction renders successive areas effectively opaque in order.

WILLIAM W. EATON.